|                                                    |                                  |
| -------------------------------------------------- | -------------------------------- |
| United States Patent [19]                          | [11]  4,265,800                  |
| Newton                                             | [45]  May 5, 1981                |

[54] STABILIZED HEAT CURABLE SILICONE ELASTOMERS

[75] Inventor: Harry V. Newton, Tecumseh, Mich.

[73] Assignee: SWS Silicones Corporation, Adrian, Mich.

[21] Appl. No.: 93,368

[22] Filed: Nov. 13, 1979

[51] Int. Cl.³ .............................................. C08L 83/04
[52] U.S. Cl. ................................................ 260/37 SB
[58] Field of Search ..................................... 260/37 SB

[56] References Cited

U.S. PATENT DOCUMENTS

| 3,624,022 | 11/1971 | Ross ................................ 260/37 SB |
| 3,711,520 | 1/1973 | Pfeifer et al. ..................... 260/37 SB |
| 3,723,481 | 3/1973 | Bobear ............................. 260/37 SB |

*Primary Examiner*—Lewis T. Jacobs

[57] ABSTRACT

Silicone elastomers having improved heat stability, and resistance to reversion may be obtained by incorporating tellurium in heat curable organopolysiloxane compositions containing amorphorus silica fillers.

7 Claims, No Drawings

STABILIZED HEAT CURABLE SILICONE ELASTOMERS

The present invention relates to heat curable silicone elastommers, particularly heat curable silicone elastomers having improved heat stability. More particularly, it relates to heat curable silicone elastomers which have improved resistance to reversion, improved tensile strength and improved durometer.

BACKGROUND OF INVENTION

Silicone elastomers are generally stable at temperatures below about 150° C. and may be used at temperatures up to about 260° C. and even up to 315° C. for short periods of time. When these same silicone elastomers are used at temperatures above about 200° C. for extended periods of time, they have a tendency to deteriorate rapidly. Since silicone elastomers are generally used at elevated temperatures in many of their applications, deterioration is a highly undesirable property.

It is known that metallic compounds can be incorporated in silicone elastomers to enhance their heat stabilty. For example, U.S. Pat. No. 2,759,904 to Talcott discloses incorporating an iron salt of a carboxylic acid into a heat curable organopolysiloxane composition to form silicone elastomers to impart heat stability thereto. Also, Talcott discloses in U.S. Pat. No. 2,999,076, adding a carboxylic acid salt of cobalt, cerium or copper to an organopolysiloxane composition to impart heat stability properties thereto. Likewise, Brown et al disclose in U.S. Pat. No. 3,082,181 the addition of a carboxylic acid salt of iron, cobalt or manganese to an organopolysiloxane composition to improve heat resistance of the silicone elastomers. U.S. Pat. No. 3,142,655 to Bobear discloses incorporating rare earth compounds in organopolysiloxane compositions to improve their resistance to heat aging.

Although the metallic compounds described above improve the heat stability of the organopolysiloxane compositions, it has been found that when an amorphorus silica is used as a filler in the organopolysiloxane compositions, the resultant compositions exhibit a substantial reduction in the tensile strength and durometer.

Therefore, it is an object of this invention to provide heat curable silicone elastomers having improved heat stability. Another object of this invention is to provide heat curable silicone elastomers having improved retention of tensile strength and durometer. A further object of this invention is to provide a method for improving the heat stability of heat curable silicone elastomers. A still further object of this invention is to improve the resistance of silicone elastomers to reversion.

SUMMARY OF INVENTION

The foregoing objects and others which will become apparent from the following description are accomplished in accordance with this invention, generally speaking, by incorporating tellurium in heat curable organopolysiloxane compositions containing amorphorus silica as a filler. When the compositions are vulcanized at elevated temperatures, they will exhibit improved heat stability, improved durometer, improved tensile strength and improved resistance to reversion. The addition of the tellurium to silicone elastomers containing amorphorus silica substantially improves the heat stability of these elastomers which are subject to extensive use at elevated temperatures.

DETAILED DESCRIPTION OF INVENTION

The silicone elastomers of this invention are prepared in the conventional manner, namely by curing at elevated temperatures heat curable organopolysiloxanes containing tellurium, vulcanizing agents, and amorphorus silica fillers. The compositions when properly cured, will provide silicone elastomers having improved heat resistance, improved durometer and tensile strength. While the presence of tellurium in these compositions will improve the physical properties of the silicone elastomers, its effectiveness is not contingent upon the type of organopolysiloxane or vulcanizing agent employed.

The organopolysiloxanes useful in this invention are commonly referred to as dialkyl or alkylaryl polysiloxane gums. These organopolysiloxanes are well known in the art and methods for producing such materials are old and widely described in the literature. The curable organopolysiloxanes have a Williams plasticity range of from 50 to 250 millimeters and have recurring structural units of the general formula:

$$R_n SiO_{4n/2}$$

where n is a number of from about 1.9 to 2.2 and R represents monovalent hydrocarbon radicals having up to 18 carbon atoms, such as alkyl, aryl, aralkyl, alkaryl, alkenyl, halogenated and cyano-substituted alkyl and aryl radicals. Also it is preferred that a majority of the R radicals in the curable organopolysiloxanes be lower alkyl radicals, for example methyl radicals. It is usually preferred that the organopolysiloxanes from which the curable compositions are prepared contain an average of from about 1.98 to about 2.2 organic groups, for example methyl groups or methyl phenyl groups per silicon atom and that more than 98 percent of the silicon atoms of the polysiloxane contain two silicon bonded organic groups, for instance, alkyl groups or mixtures of alkyl and aryl groups, per silicon atom. Included specifically in this formula are the dimethylpolysiloxanes, methylphenylpolysiloxanes, methyvinylpolysiloxanes, especially those having from 0.01 to 0.35 mole percent vinyl groups and copolymers of such units, such as copolymers containing dimethyl and phenylmethylsiloxane units and copolymers containing phenylmethyl, dimethyl and vinylmethylsiloxane units.

Various antistructuring agents may be incorporated in the compositions of this invention to prevent hardening or "crepe aging" of the materials prior to vulcanization. Examples of suitable anti-structuring agents are water; hydroxyl-terminated silanes and siloxanes having a viscosity of from about 10 to 100 centistokes, such as diphenylsilane diols, methylphenylsilane diols, hydroxylated dimethylpolysiloxanes, hydroxylated methylphenylpolysiloxanes, hydroxylated diphenylpolysiloxanes, methyl endblocked dimethylpolysiloxane fluids; phosphate fluids such as tripropylphosphate and tributylphosphate; glycols such as methylene glycol and propylene glycol; esters; and anhydrides, such as phthalic anhydride.

The amount of antistructuring agents employed in these compositions generally ranges from about 2 to 30 percent, preferably from about 5 to 20 percent, by weight based on the weight of the organopolysiloxane polymers.

The amount of finely divided tellurium necessary for imparting desirable properties to the cured silicone elastomers may be varied within wide limits. On a weight basis, amounts as low as 0.005 percent of tellurium based on the organpolysiloxane polymers will be found to exert an improvement in these properties. Generally, amounts ranging from about 0.01 to 5 percent, more preferably from about 0.02 to 2 percent, by weight based on the weight of the organopolysiloxane polymers are sufficient for imparting these desirable properties.

The amorphorus silica fillers which are employed with tellurium in the curable organopolysiloxane compositions of this invention are fumed silica and precipitated silica. The precipitated silica is available from, for example, PPG Industries, Inc. The amorphorus silicas are micro fine particles having an average size of about 0.02 microns and have a surface area of from about 130 to 160 m$^2$/g. per gram. The fumed silicas may have a surface area of from about 50 up to about 400 m$^2$/g.

Other finely divided fillers, such as reinforcing and non-reinforcing fillers may be incorporated in combination with the silica fillers in the curable organopolysiloxane compositions. The organopolysiloxane compositions may contain only silica fillers or the silica fillers may be combined with other fillers and added to the polysiloxane polymers. The amount of fillers used in combination with the organopolysiloxane polymers may be varied within wide limits, for example, from about 10 to 300 percent by weight of fillers based on the weight of the organopolysiloxane polymers. The exact amount of fillers used will depend upon such factors as, for example, the application for which the curable organopolysiloxane compositions are intended, the type of fillers employed, e.g., the density of the fillers, the type of curable organopolysiloxanes employed, etc. Obviously, mixtures of reinforcing fillers with nonreinforcing fillers may be employed.

Examples of other fillers which may be used in combination with the amorphorus silica are asbestos, clay, hydrated calcium silicate, zinc sulfide, silica aerogel, barium titanate, glass fiber, floc, iron oxide, bentonite, zinc oxide, nickelous oxide, magnesium oxide, micronized graphite, micronized slate, micronized mica, celite, lead dioxide, lead oxide, blue lead, alumina either hydrated or dehydrated, and calcium carbonate.

Various curing agents may be added to the organopolysiloxane compositions to effect rapid conversion of the compositions to an elastomeric state. Among such curing agents may be mentioned, for example, benzoyl peroxide, t-butyl perbenzoate, bis (2,4-dichlorobenzoyl) peroxide, dicumyl peroxide, dialkyl peroxides, such as di-t-butyl peroxide, etc. These curing agents may be present in amounts ranging from about 0.1 to as high as 4 to 8 percent by weight or even more based on the weight of the organopolysiloxane polymers.

The manner in which the present invention may be practiced may be widely varied. Although the tellurium may be incorporated in the curable organopolysiloxane polymers before the addition of the amorphorus silica filler and other reinforcing and non-reinforcing fillers, if used, it may be incorporated simultaneously with the amorphorus silica and other fillers, if employed. Preferably, however, the tellurium is added to the organopolysiloxane polymers prior to milling. Curing agents and other additives such as dyes, pigments, reinforcing and non-reinforcing fillers, and flame retardants may be added to the organpolysiloxane compositions during the milling operation.

Alternatively, the tellurium may be added to the organopolysiloxane compositions and then milled with the amorphorus silica filler and the reinforcing and non-reinforcing fillers at some future time.

When the organopolysiloxane compositions are molded, they are heated to temperatures of from 100° to 200° C. for varying periods of time, for example, from about 5 to 30 minutes or more. Molding pressures ranging from about 10 to 1,000 p.s.i. or more are advantageously used. The molded product is preferably given a post-cure treatment at elevated temperatures, for example, from about 1 to 24 hours or more and at temperatures of from 150° to 250° C. to bring out the optimum properties of the cured silicone elastomers.

The silicone elastomers of this invention containing amorphorus silica and at least 0.005 percent and preferably not more than 5 percent of tellurium based on the weight of the organopolysiloxane polymers exhibit improved heat stability, improved tensile strength and durometer over conventional silicone elastomers containing other metallic compounds as heat stabilizers.

The silicone elastomers of this invention are capable of withstanding elevated temperatures of from 150° to over 300° C. for extended periods of time and retain their desirable properties. Such a range of properties makes them highly useful as insulating materials for electrical conductors and for the production of commercial items such as tubing, hoses, sheeting, gaskets and the like.

The embodiments of this invention are further illustrated by the following examples in which all parts are by weight unless otherwise specified.

EXAMPLE 1

(a) A polysiloxane gum is prepared by co-reacting octamethylcyclotetrasiloxane and tetramethyltetravinylcyclotetrasiloxane in such proportions that the vinyl containing polysiloxane gum contains about 0.2 mole percent vinyl groups on the polysiloxane chain in the presence of about 0.001 percent by weight of potassium hydroxide at a temperature of from about 140° to 150° C. for from 4 to 5 hours. The resultant polysiloxane gum has an average of about 2.0 methyl groups per silicon atom.

(b) About 100 parts of the polysiloxane gum prepared in (a) above are mixed with 18 parts of hydroxyl end-blocked dimethylpolysiloxane fluid having a viscosity of 50 cs. at 25° C., and about 25 parts of a hydrated silica (identified as Hi-Sil$^R$, available from PPG Industries, Inc.), then heated for 2 hours at 177° C. and cooled.

(c) To about 100 parts of the formulation prepared in (b) above is added a peroxide catalyst. The formulations are shown in Table I.

EXAMPLE 2

(a) Several formulations are prepared in which about 100 parts of the polysiloxane gum prepared in Example 1 (a) above are mixed with 18 parts of a hydroxyl end-blocked dimethylpolysiloxane fluid having a viscosity of 50 cs. at 25° C., about 25 parts of a hydrated silica (identified as Hi-Sil$^R$, available from PPG Industries, Inc.) and various metallic compounds and then heated for 2 hours at 177° C.

(b) About 100 parts of each of the formulations are mixed with a peroxide catalyst. The formulations are shown in Table I.

Each of the catalyzed formulation shown in Table I is molded and press-cured for 5 minutes at 115° C. and at a pressure of 600 p.s.i.

The physical properties of each of the press-cured silicone elastomers are illustrated in Table II.

Each of the press-cured silicone elastomers whose formulations are shown in Table I is post-cured for about 24 hours at 249° C. in an air circulating oven. The physical properties of the silicone elastomers are shown in Table III.

TABLE I

| Ingredients | FORMULATIONS, PARTS | | | | | | | | | | | |
|---|---|---|---|---|---|---|---|---|---|---|---|---|
| | A | A$^1$ | B | B$^1$ | C | C$^1$ | D | D$^1$ | E | E$^1$ | F | F$^1$ |
| Example 1 (b) | 100 | 100 | | | | | | | | | | |
| Example 2 | | | 100 | 100 | 100 | 100 | 100 | 100 | 100 | 100 | 100 | 100 |
| Peroxide Catalyst | | | | | | | | | | | | |
| Bis (2,4-dichloro-benzoyl) peroxide | 1.2 | | 1.2 | 1.2 | 1.2 | 1.2 | 1.2 | 1.2 | | | 1.2 | |
| 2,5-bis (tert-butyl peroxy)-2,5-dimethyl-hexane | | 0.8 | | | | | | | 0.8 | 0.8 | | 0.8 |
| Metallic Compounds | | | | | | | | | | | | |
| Selenium | | | .25 | .5 | | | | | | | | |
| Ferric oxide | | | | | .5 | 1.0 | | | | | | |
| Cerium hydrate | | | | | | | 2 | 4 | 2 | 4 | | |
| Cerium Octoate | | | | | | | | | | | .25 | .25 |
| Ferric Octoate | | | | | | | | | | | | |
| Zinc Octoate | | | | | | | | | | | | |
| Tellurium | | | | | | | | | | | | |

| Ingredients | FORMULATIONS, PARTS | | | | | | | | | |
|---|---|---|---|---|---|---|---|---|---|---|
| | G | G$^1$ | H | H$^1$ | I | I$^1$ | J | J$^1$ | K | K$^1$ |
| Example 1 (b) | | | | | | | | | | |
| Example 2 | 100 | 100 | 100 | 100 | 100 | 100 | 100 | 100 | 100 | 100 |
| Peroxide Catalyst | | | | | | | | | | |
| Bis (2,4-dichloro-benzoyl) peroxide | 1.2 | 1.2 | | | 1.2 | | 1.2 | 1.2 | | |
| 2,5-bis (tert-butyl peroxy)-2,5-dimethyl-hexane | | | 0.8 | 0.8 | | 0.8 | | | 0.8 | 0.8 |
| Metallic Compounds | | | | | | | | | | |
| Selenium | | | | | | | | | | |
| Ferric oxide | | | | | | | | | | |
| Cerium hydrate | | | | | | | | | | |
| Cerium Octoate | | | | | | | | | | |
| Ferric Octoate | .25 | .5 | .25 | .5 | | | | | | |
| Zinc Octoate | | | | | .5 | .5 | | | | |
| Tellurium | | | | | | | .25 | .5 | .25 | .5 |

TABLE II

| Physical Properties | FORMULATIONS | | | | | | | | | | | |
|---|---|---|---|---|---|---|---|---|---|---|---|---|
| | A | A$^1$ | B | B$^1$ | C | C$^1$ | D | D$^1$ | E | E$^1$ | F | F$^1$ |
| Tensile strength, p.s.i. | 850 | 880 | 940 | 875 | 760 | 780 | 690 | 900 | 600 | 900 | 940 | |
| Elongation, percent | 525 | 650 | 730 | 620 | 640 | 540 | 570 | 625 | 575 | 525 | 625 | 800 |
| Durometer | 38 | 32 | 38 | 39 | 38 | 38 | 36 | 32 | 35 | 35 | 34 | 29 |

| Physical Properties | FORMULATIONS | | | | | | | | | |
|---|---|---|---|---|---|---|---|---|---|---|
| | G | G$^1$ | H | H$^1$ | I | I$^1$ | J | J$^1$ | K | K$^1$ |
| Tensile strength, p.s.i. | 900 | 900 | 995 | 960 | 890 | 875 | 860 | 800 | 800 | 890 |
| Elongation, percent | 650 | 725 | 775 | 800 | 790 | 800 | 570 | 520 | 675 | 650 |
| Durometer | 34 | 32 | 32 | 31 | 31 | 30 | 39 | 40 | 37 | 37 |

TABLE III

| Physical Properties | FORMULATIONS | | | | | | | | | | | |
|---|---|---|---|---|---|---|---|---|---|---|---|---|
| | A | A$^1$ | B | B$^1$ | C | C$^1$ | D | D$^1$ | E | E$^1$ | F | F$^1$ |
| Tensile strength, p.s.i. | 450 | 410 | 265 | 275 | 475 | 420 | 350 | 250 | 330 | 310 | 380 | 330 |
| Elongation, percent | 470 | 530 | 475 | 375 | 375 | 350 | 350 | 350 | 425 | 350 | 440 | 475 |
| Durometer | 30 | 27 | 24 | 23 | 30 | 31 | 32 | 37 | 29 | 31 | 26 | 24 |

| Physical Properties | FORMULATIONS | | | | | | | | | |
|---|---|---|---|---|---|---|---|---|---|---|
| | G | G$^1$ | H | H$^1$ | I | I$^1$ | J | J$^1$ | K | K$^1$ |
| Tensile strength, p.s.i. | 400 | 400 | 370 | 330 | 410 | 400 | 775 | 600 | 500 | 550 |

TABLE III-continued

| | | | | | | | | | | |
|---|---|---|---|---|---|---|---|---|---|---|
| Elongation, percent | 375 | 400 | 530 | 475 | 550 | 440 | 300 | 125 | 150 | 100 |
| Durometer | 31 | 31 | 29 | 27 | 27 | 33 | 46 | 65 | 68 | 90 |

Table III shows that the durometer and tensile strength of the silicone elastomers containing tellurium are substantially improved over the silicone elastomers containing other well-known metallic compounds.

Each of the silicone elastomers shown in Table III is heat-aged for 70 hours at 232° C. in an air circulating oven, at the end of which time the physical properties are again determined. Table IV shows the physical properties of the silicone elastomers after heat-aging.

TABLE IV

| | FORMULATIONS | | | | | | | | | | |
|---|---|---|---|---|---|---|---|---|---|---|---|
| Physical Properties | A | A$^1$ | B | B$^1$ | C | C$^1$ | D | D$^1$ | E | E$^1$ | F | F$^1$ |
| Tensile strength, p.s.i. | 550 | 530 | 310 | 390 | 525 | 500 | 500 | 370 | 475 | 390 | 625 | 440 |
| Elongation, percent | 480 | 575 | 475 | 500 | 330 | 320 | 425 | 330 | 500 | 390 | 510 | 500 |
| Durometer | 36 | 36 | 25 | 28 | 38 | 37 | 35 | 37 | 36 | 38 | 33 | 34 |

| | FORMULATIONS | | | | | | | | | |
|---|---|---|---|---|---|---|---|---|---|---|
| Physical Properties | G | G$^1$ | H | H$^1$ | I | I$^1$ | J | J$^1$ | K | K$^1$ |
| Tensile strength, p.s.i. | 540 | 490 | 500 | 440 | 420 | 410 | 730 | 610 | 540 | 600 |
| Elongation, percent | 450 | 425 | 570 | 500 | 500 | 450 | 200 | 200 | 200 | 200 |
| Durometer | 37 | 35 | 34 | 34 | 34 | 39 | 60 | 62 | 75 | 95 |

EXAMPLE 3

(a) About 100 parts of the polysiloxane gum of Example 1(a) are mixed with 18 parts of a hydroxyl endblocked dimethylpolysiloxane fluid having a viscosity of 50 cs. at 25° C., about 25 parts of fumed silica (identified as AEROSIL, available from DEGUSSA) and 1 part of tellurium and heated for about 2 hours at 177° C. About 100 parts of the resultant composition are mixed with 0.8 part of 2,5-bis(tert-butylperoxy)-2, 5-dimethylhexane.

(b) The procedure described in Example 3(a) is repeated, except that 0.5 part of tellurium are used.

(c) Formulations (a) and (b) are press-cured for 5 minutes at 115° C. and at 600 p.s.i., then post-cured for about 24 hours at 249° C. in an air circulating oven and then heat-aged for 70 hours at 232° C. in an air circulating oven. The physical properties are shown in Table V.

TABLE V

| | Formulations | |
|---|---|---|
| Physical Properties | (a) | (b) |
| Press-cured | 1225 | 1180 |
| Tensile Strength, p.s.i. | 570 | 580 |
| Elongation, percent | 570 | 580 |
| Durometer | 47 | 47 |
| Post-cured | | |
| Tensile Strength, p.s.i. | 575 | 430 |
| Elongation, percent | 75 | 40 |
| Durometer | 75 | 76 |
| Heat-aged | | |
| Tensile Strength, p.s.i. | 410 | 410 |
| Elongation, percent | 60 | 50 |
| Durometer | 78 | 75 |

What is claimed is:

1. A heat curable organopolysiloxane composition composed of an organopolysiloxane polymer, an organic peroxide curing agent, an amphorous silica filler and at least 0.005 percent by weight based on the weight of the organopolysiloxane polymer of tellurium.

2. The composition of claim 1 wherein the composition contains from 0.005 to 5 percent by weight of tellurium.

3. The composition of claim 1 wherein the organopolysiloxane polymer has from 1.9 to 2.2 organic radicals per silicon atom.

4. The composition of claim 1 which includes an anti-structuring agent selected from the group consisting of water, hydroxyl-terminated silanes and siloxanes, methyl enblocked polysiloxane fluids, phosphate fluids, glycols, esters and anhydrides thereof in an amount of from about 2 to 30 percent by weight based on the weight of the organopolysiloxane polymer.

5. The composition of claim 1 wherein the organopolysiloxane polymer contains from 0.01 to 0.35 mole percent vinyl groups.

6. The heat cured organopolysiloxane elastomer of claim 1.

7. The elastomer of claim 6 wherein the organopolysiloxane polymer is a methylvinylsiloxane containing from 0.01 to 0.35 mole percent vinyl groups.

* * * * *